United States Patent [19]

Rieser

[11] 3,714,991
[45] Feb. 6, 1973

[54] ALTERNATING MECHANISM FOR HYDRAULIC MARKERS

[75] Inventor: Donald E. Rieser, Wheaton, Ill.

[73] Assignee: International Harvester Company, Chicago, Ill.

[22] Filed: Feb. 26, 1971

[21] Appl. No.: 119,274

[52] U.S. Cl. .................................................. 172/130
[51] Int. Cl. ............................................ A01b 17/00
[58] Field of Search ...... 172/126, 127, 128, 130, 209, 172/210, 211

[56] References Cited

UNITED STATES PATENTS

| | | | |
|---|---|---|---|
| 3,556,226 | 1/1971 | Brewer | 172/130 |
| 3,587,750 | 1/1969 | Cantral | 172/130 |
| 3,511,316 | 1/1967 | Oerman et al. | 172/126 |
| 2,891,459 | 6/1959 | Tominac | 172/210 |
| 3,186,496 | 6/1965 | Cox et al. | 172/211 |
| 3,139,941 | 7/1964 | Graham et al. | 172/130 |
| 3,450,210 | 6/1969 | Smith | 172/128 X |
| 3,537,533 | 11/1970 | Morehouse et al. | 172/130 |
| 3,575,242 | 4/1971 | Olsson | 172/130 |
| 3,454,103 | 7/1969 | Krumholz | 172/128 |
| 3,146,833 | 9/1964 | Friemel et al. | 172/126 |

Primary Examiner—Robert E. Pulfrey
Assistant Examiner—R. T. Hader
Attorney—Floyd B. Harman

[57] ABSTRACT

In a planter vertically movable between operating and transport positions and having alternately operating right and left hand markers raised and lowered by hydraulic cylinders, a hydraulic circuit is provided wherein fluid under pressure is directed to one of the marker cylinders to raise the operating marker when the planter is raised, and alternator valve means in the circuit is shiftable between two positions by the vertical movement of the planter to alternately lower the markers when the planter is lowered.

16 Claims, 11 Drawing Figures

PATENTED FEB 6 1973

INVENTOR
DONALD E. RIEISER

BY *F. David DeBucher* ATT'Y.

INVENTOR
DONALD E. RIESER 3,714,991

ALTERNATING MECHANISM FOR HYDRAULIC MARKERS

BACKGROUND OF THE INVENTION

This invention relates to hydraulically operated markers for implements, and particularly to means for alternately operating the markers.

In planters and the like it is customary to employ a pair of left and right hand markers for alternate use upon reversing the direction of operation at the end of a field. The operating marker is lifted when the implement is raised and the other marker lowered when operation is resumed. In the past the operator has been occupied with the steering of the tractor by which the implement is propelled, as well as with the raising and lowering of the implement at the proper time, and the coordination of these operations with the raising of one marker and lowering the other has been difficult and time consuming.

It has been proposed to provide mechanism interconnecting the markers with the implement lifting apparatus to raise the operating marker with the lifting of the implement and thus reduce the number of operations needed to control the implement. However, such mechanisms have been complicated, costly and inefficient. The increasing size of implements and the weight of the markers has necessitated the use of hydraulic power not only for raising and lowering the implement but also for operating the markers, but here again the tractor operator has been required to operate separate controls for the hydraulic lifting cylinder as well as for the two marker cylinders. Therefore, the present invention has for its object the provision of means automatically operable with the movement of the implement between operating and transport positions for alternately raising and lowering hydraulically operated markers.

Another object of the invention is the provision, in an implement such as a planter having hydraulically operated markers, of means for controlling the flow of fluid to and from a pair of marker cylinders to alternately raise one marker and lower the other.

Another object of the invention is the provision, in an implement vertically movable between operating and transport positions and having a pair of hydraulically operated markers, of reversible valve means actuated by the vertical movement of the implement for automatically effecting the alternate raising and lowering of the markers.

A further object of the invention is the provision, in an implement raised and lowered by a hydraulic lifting cylinder and having markers operated by hydraulic cylinders, of a fluid circuit between the lifting cylinder and the marker cylinders including an alternator or reversing valve actuated by the operation of the lifting cylinder for alternately operating the markers.

DESCRIPTION OF THE PREFERRED EMBODIMENT

Figure 1:
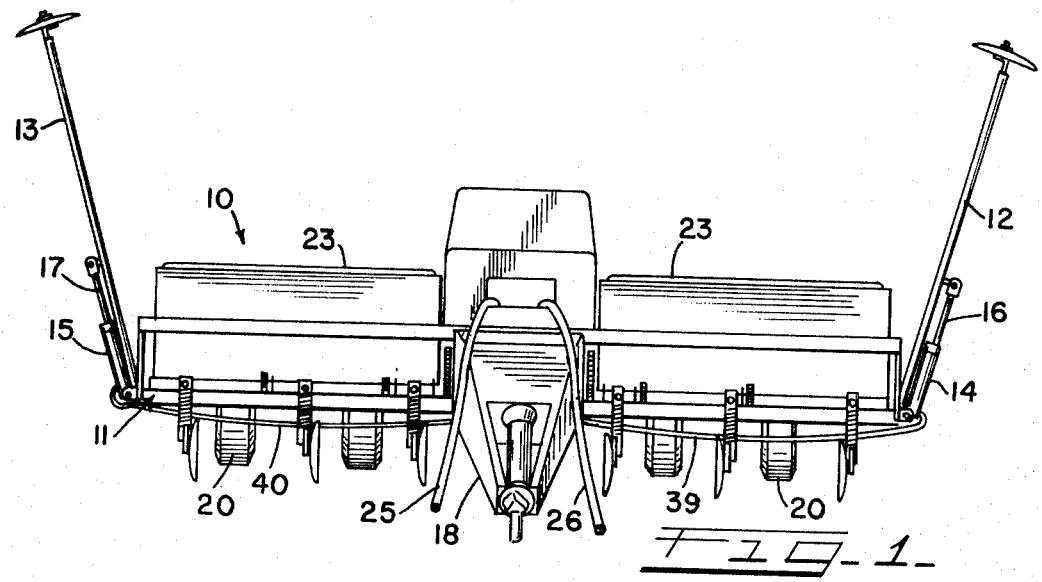
FIG. 1 is a front view of a planter having marker control means incorporating the features of this invention.
Figure 9:
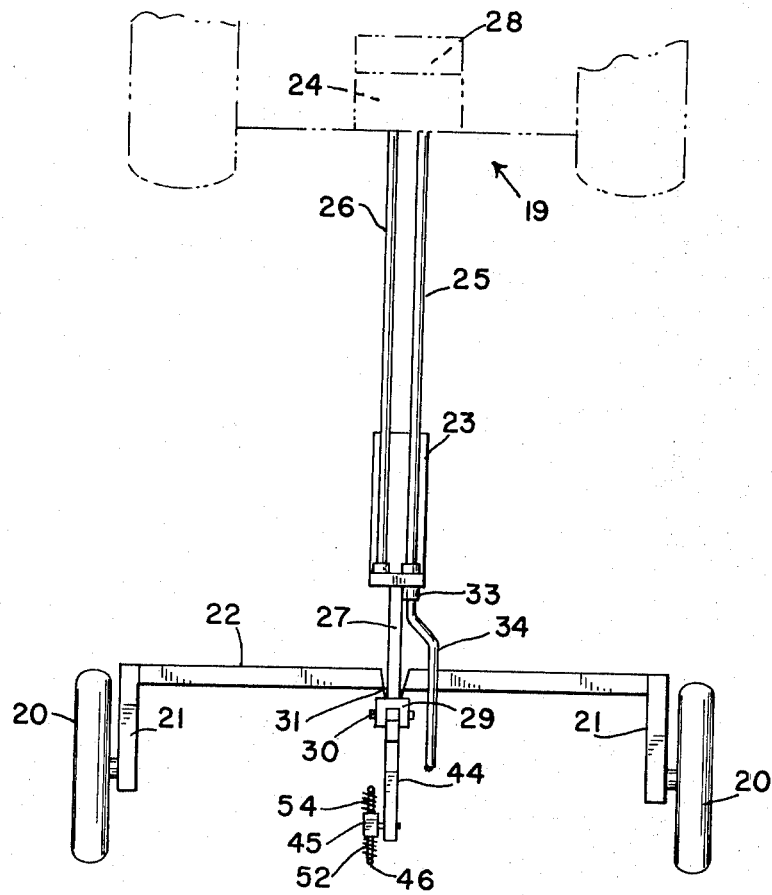
FIG. 9 is a diagrammatic representation of the rear end of a tractor and a part of the implement, showing the manner in which the lifting cylinder is connected to the supporting wheels for raising and lowering the implement.

With particular reference to FIGS. 1 and 9, the implement with which this invention is concerned is a multi-row planter generally designated by the numeral 10 and comprising a frame 11 to the ends of which are pivotally connected left and right hand markers 12 and 13, respectively, which are lifted to the transport positions shown by hydraulic cylinders 14 and 15, pivotally anchored to the planter frame and provided with piston rods 16 and 17 slidable therein and connected, respectively, to markers 12 and 13.

To the front of the planter frame 11 is secured a hitch structure 18 adapted for connection to a tractor, the rear end of which is indicated diagrammatically at 19 in FIG. 9, and the planter is supported for vertical movement between operating and transport positions by wheels 20, two of which are indicated in FIG. 9, carried at the ends of crank arms 21 affixed at their forward ends to a transverse shaft 22 rockably mounted by well known means, not shown, on the planter frame.

Power transmission means for rocking wheel shaft 22 to vertically swing wheels 20 is provided in the form of a double acting hydraulic lifting cylinder 23, mounted on the planter frame and receiving fluid under pressure from a conventional valve controlled pressure source indicated at 24 on the tractor, fluid being fed to the raise and lower sides of the cylinder's piston in well known manner through hydraulic hose lines 25 and 26, respectively, to extend and retract piston rod 27 to raise and lower the implement, rod 27 being shown in FIG. 9 in its extended or raise position. Upon retraction of the rod in the cylinder fluid is returned to the reservoir 28. Piston rod 27 is provided with a clevis 29 connected by a pin 30 to a movable part in the form of an arm 31 affixed to shaft 22 for rocking the shaft to raise and lower the implement.

In FIG. 1 it may be understood that the planter and both markers 12 and 13 are in their raised or transport position. When the planter is lowered by retraction of rod 27 in lifting cylinder 23 and is propelled by the tractor in one direction over a field, one of the markers is lowered to its operating position, and when the end of the field is reached and the direction of travel is to be reversed, the implement is raised by directing fluid through hose line 25 to the raise side of the lifting cylinder to extend rod 27. At the same time, the operating marker is raised. Upon again lowering the planter for operation the marker at the other end of the planter frame is lowered.

Figure 2:
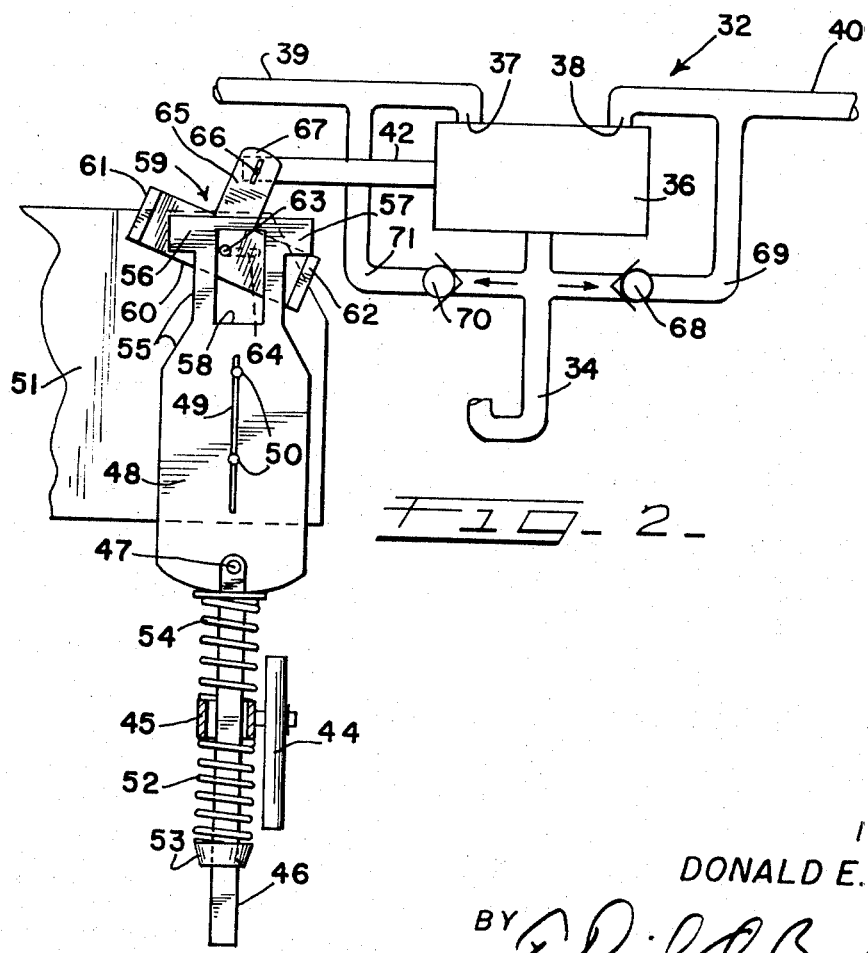
FIG. 2 is an enlarged detail showing diagrammatically a portion of the fluid circuit with the alternator valve and the mechanism for automatically operating the valve.

Fluid control means for automatically operating the markers 12 and 13 includes a hydraulic fluid circuit and reversing or alternator valve assembly indicated diagrammatically at 32 in FIG. 2, comprising a fitting 33 connected to the lifting cylinder 23 and providing communication between the raise line 25 and one end of a hose 34, the other end of which is connected at supply port 35 to an alternator valve 36. Valve 36, as shown in FIGS. 2, 10 and 11 has a pair of ports 37 and 38 to which are respectively connected one end of left and right hand conduits 39 and 40, the other ends of which are connected to marker cylinders 14 and 15, as shown in FIG. 1, port 35 of the valve being connected to ports 37 and 38 through a cavity 41.

Figure 10:
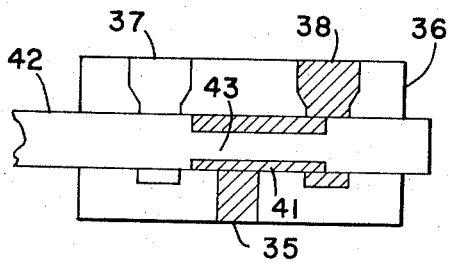
FIG. 10 is a diagrammatic view of one position of the alternator valve plunger in the housing with the valve open to one of the marker cylinders.
Figure 11:
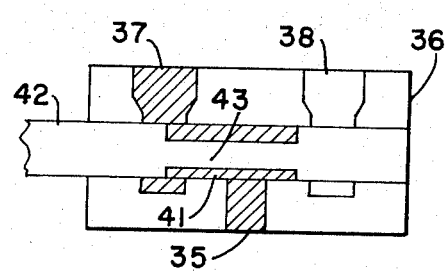
FIG. 11 is a view similar to FIG. 10, showing the position of the valve plunger for operating the other marker cylinder.

A valve stem or plunger 42 slidable in valve 36 is provided with a reduced portion 43 and is shiftable between two positions to provide communication between supply port 35 and one or the other of the marker ports 37 or 38, as indicated in FIGS. 10 and 11. Shifting of plunger 42 between its two positions is accomplished by actuating mechanism including an extension 44 affixed to arm 31 on wheel shaft 22, and shown in FIGS. 2 and 9.

As best shown in FIG. 2, extension 44 has mounted thereon a swivel 45 having an opening therein to slidably receive a rod 46, one end of which is pivotally connected at 47 to one end of a slide member 48 having a slot 49 therein in which is received a pair of aligned guide pins 50 carried by a mounting bracket 51 forming part of the planter frame 11. A coil spring 52 surrounding rod 46 is confined between swivel 45 and a collar 53, and another spring 54 is mounted on the rod between the swivel and slide member 48. Slide member 48 is thus reciprocated by the swinging movement of rock arm 31 in response to extension and retraction of rod 27 in lift cylinder 23 to raise and lower the planter.

The end of slide 48 opposite rod 46 has a reduced neck portion 55 terminating in laterally projecting ears 56 and 57 and has formed therein a rectangular opening 58. A T-shaped rockable member 59 disposed between slide 48 and mounting bracket 51 has a broad base portion 60 having at its ends right angled flanges 61 and 62 straddling the neck portion 55 of the slide and carrying a pin 63 receivable in a slot 64 formed in bracket 51. The leg 65 of the T-shaped rockable member 59 is pivotally connected to valve plunger 42 by a pin 66 carried at one end of the plunger and received in a slot 67 in leg 65.

When the planter and one of the markers 12 or 13 are in the lowered or operating position and the planter and operating marker are to be raised, as at the end of a field when the direction of travel is to be reversed, fluid under pressure is supplied to the cylinder 14 or 15 for the lowered marker from the pressure source 24 on the tractor through raise line 25, hose 34 and the hydraulic circuit 32 to the appropriate marker cylinder to raise the operating marker to its transport position where it is held by the fluid in the cylinder.

Figure 8:
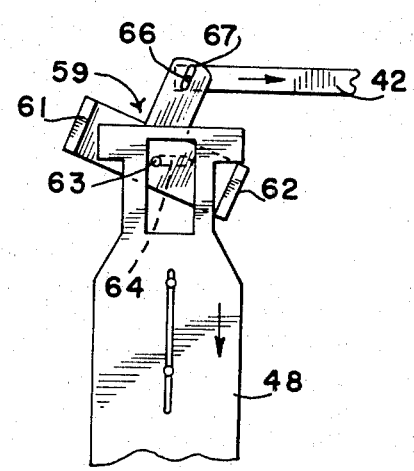
FIG. 8 completes the operation begun in FIG. 6 with the valve again reversed.

Let us assume now, for example, that the planter is in the transport position and is to be lowered to begin operation, and right hand marker 13 is to be lowered from the transport position of FIG. 1 to its operating position simultaneously with the operation of the lifting cylinder 23. It may be noted that the actuating slide 48 is at the bottom of its stroke as in FIGS. 2 and 8 with the guide pins 50 in the position shown in slot 49 and the plunger 42 of the alternator valve 36 is to the right as shown in FIG. 10 with communication established between supply port 35 and right hand marker cylinder port 38. Port 37 to left hand marker cylinder 14 is closed and the right hand marker cylinder is open through valve supply port 38 and hose 34 to the raise side of lifting cylinder 23 and line 25. As rod 27 is retracted in the lift cylinder to lower the planter, oil from right hand marker cylinder 15 is returned by the weight of marker 13 through valve ports 38 and 35 and hose 34 to the tractor reservoir 28 with the oil from the raise side of the lifting cylinder.

Figure 3:
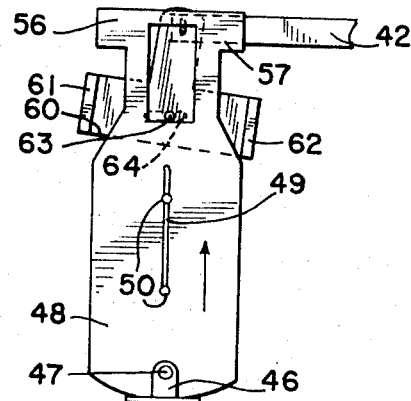
FIG. 3 is a detail of the valve actuating parts with the implement lowered and the valve open to one of the marker cylinders.
Figure 6:
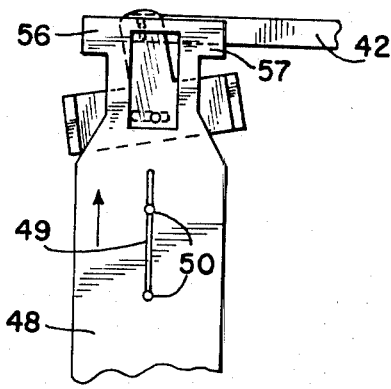
FIG. 6 is a detail similar to FIG. 3, but with the actuating parts in the valve-reversed position with the implement lowered.

At the same time that the planter is lowered the movement of wheel shaft arm 31 moves slide 48 upwardly, one edge of the neck portion 55 of the slide engaging flange 62 and rocking T-shaped member 59 about the axis of pivot pin 66 to the position of FIG. 3 with pin 63 disposed between the ends of slot 34, and without shifting the valve plunger 42 from its position providing communication between ports 35 and 38. The limit of movement of slide 48 is reached when the lower pin 50 engages the lower end of slot 49, as in FIGS. 3 and 6.

Figure 4:
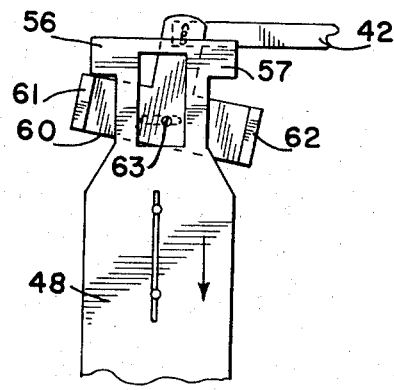
FIG. 4 illustrates an intermediate position of the valve actuating parts while raising the implement.
Figure 5:
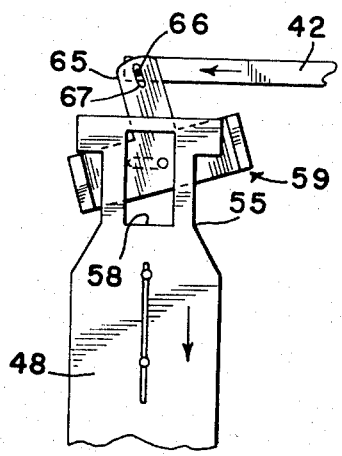
FIG. 5 completes the operation begun in FIG. 3 and continued in FIG. 4 with the implement raised to its transport position and after the actuating parts have been shifted to open the valve to the other marker cylinder.

Upon reaching the end of the field, piston rod 27 of lift cylinder 23 is extended to rock arm 31 in a direction to raise the planter. Oil under pressure from the source 24 entering the raise side of the lift cylinder also flows through hose 34 and initially enters the alternator valve and is fed through port 38 to the right hand marker cylinder 15 to extend rod 17 therein and begin lifting the marker. Slide 48 now begins to move in the direction of the arrow in FIG. 4, taking up lost motion until ear 56 of slide 48 engages flange 61 of the rockable member 59. Valve port 38 remains open and fluid continues to flow to the marker cylinder to lift the right hand marker until the counterclockwise rocking of member 59, shown in FIG. 5, shifts plunger 42 to the left, closing port 38 and opening port 37.

Since the fluid can no longer flow through port 38 to right hand cylinder 15, it by-passes the alternator valve and continues to flow to the right hand cylinder through a check valve 68 contained in a by-pass conduit 69 shown in FIG. 2 until the right hand marker is in the transport position of FIG. 1.

The planter is now again in its transport position for reversing its direction of travel, and upon again lowering the planter the cycle is repeated.

Figure 7:
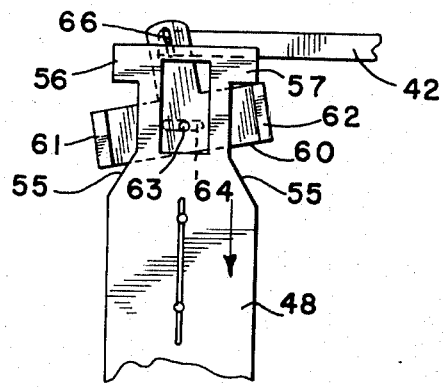
FIG. 7 shows an intermediate step in the position of the parts during raising of the implement, and corresponding to the intermediate position of FIG. 4.

With the lowering of the planter, slide 48 again moves upwardly, one edge of neck portion 55 engaging flange 61 of rockable member 59 and rocking it clockwise about the axis of pin 66 until pin 63 is between the ends of slot 64, without reversing the valve but predisposing the rockable member 59 to engagement of ear 57 of the slide with flange 62. The parts are now in the position of FIG. 6. Upon again operating lifting cylinder 23 to raise the planter, oil under pressure, as before, initially enters port 35 of valve 36, passing through port 37 and left hand conduit 39 to cylinder 14, beginning the lifting of the left hand marker 12. Slide 48 continues to move downwardly, and engagement of ear 57 with flange 62 rocks member 59 through the position of FIG. 7.

With pin 66 as a fulcrum pin 63 seats in the left end of slot 64 and becomes the fulcrum for continued clockwise movement of rockable member 59. Continued movement of slide 48 downward rocks member 59 to the position of FIG. 8 with the valve plunger 42 again shifted to the right to open port 38 and close port 37. With the closing of valve port 37 fluid under pressure from the lifting cylinder now flows through a check valve 70 contained in by-pass conduit 71 to the left hand marker cylinder 14 to complete the lifting of the left hand marker 12.

It is believed that the construction and operation of the novel means of this invention for alternately raising and lowering a pair of hydraulically operated markers will be clearly understood from the foregoing description. It may be further noted, however, that the extent of movement of arm 31 is greater than that of the slide 48 for actuating alternator valve 36 and a part of this extra motion is absorbed by the springs 52 and 54, and the lost motion between the slide 48 and rockable member 59 permitting the operator, when crossing grass waterways and the like, to raise the planter part way without reversing the valve and alternating the markers.

What is claimed is:

1. In an implement having a frame, a part mounted on the frame for movement relative thereto in response to movement of the frame between operating and transport positions, left and right hand row markers mounted on the frame, left and a right hand hydraulic marker cylinders mounted on the frame and operatively connected to the respective right and left hand markers, fluid control means for directing fluid under pressure to said marker cylinders to move said markers between operating and transport positions, and alternator valve means in said fluid control means operated by the movement of said part for changing the direction of fluid flow to and from one or the other of said marker cylinders to alternately raise and lower said markers.

2. The invention set forth in claim 1, wherein said valve means has a supply port and a pair of marker ports, left and right hand conduits connecting said marker ports to the respective of said marker cylinders, and a plunger is provided in said valve shiftable by said movement of said part between positions alternately opening and closing said marker ports.

3. The invention set forth in claim 2, wherein said fluid control means includes a pressure source and a reservoir and said marker cylinders are single acting cylinders, fluid under pressure being directed thereto from said pressure source to alternately operate the marker cylinders to move the markers to their transport position, and the weight of each of said markers, upon return thereof to its operating position, effecting the return of the fluid from the marker cylinder to said reservoir.

4. The invention set forth in claim 3, wherein said implement is supported by wheels mounted on a shaft rockably carried by the frame, and said part is an arm affixed to the shaft and rockable to raise and lower the frame, actuating means being provided operatively connecting said arm to said valve plunger to shift the latter in response to the movement of said arm.

5. The invention set forth in claim 4, wherein said shaft is rocked by a hydraulic lifting cylinder mounted on the frame having a piston rod extensible and retractable therein operatively connected to said arm and having a raise side and a lower side receiving fluid under pressure from said source, a return conduit being provided connecting the raise side of said lifting cylinder to said valve supply port to alternately return the fluid from each marker cylinder to the reservoir with the fluid from the raise side of the lifting cylinder.

6. The invention set forth in claim 5, wherein said actuating means connecting said arm to said valve plunger includes lost motion means operable to shift said plunger from one of its positions to the other after a predetermined movement of said arm to raise the frame, whereby limited raising of the frame is accommodated without alternating the markers.

7. The invention set forth in claim 6, wherein a by-pass connection is provided between said return conduit and each of said marker cylinders, each of said by-pass connections including a check valve operable to direct fluid under pressure from said lifting cylinder to one of said marker cylinders to raise the associated marker when the lifting cylinder is actuated to raise the implement while accommodating return of the fluid through said alternator valve means when the implement and said marker are lowered.

8. The invention set forth in claim 7, wherein said actuating means comprises a slide member operatively connected to said arm and mounted on the planter for reciprocation relative thereto in response to the movement of said arm, and a rockable member mounted on the frame operatively connected to said slide and to said plunger to transmit the motion of said slide to said plunger to shift the latter and reverse the valve.

9. The invention set forth in claim 8, wherein said rockable member is rocked in one direction to shift said plunger by movement of said slide in one direction in response to movement of said arm to raise the frame, the rocking of the rockable member in the other direction by movement of the slide in the other direction being ineffective to shift said plunger.

10. The invention set forth in claim 9, wherein said rockable member is alternately rockable in opposite directions to reverse said valve by the movement of said slide in one direction in response to the raising of the implement.

11. In an implement having a frame adapted for connection to a tractor having a source of fluid under pressure, a hydraulic lifting cylinder mounted on the frame receiving fluid under pressure from said source for raising and lowering the implement, a pair of left and right hand row markers mounted on the frame, left and right hand hydraulic marker cylinders mounted on the frame operatively connected to said markers for raising and lowering the latter, fluid control means operatively connecting the lifting cylinder to said marker cylinders for directing fluid under pressure from the lifting cylinder to said marker cylinders, alternator valve means in said fluid control means, and means operatively connecting said lifting cylinder to said alternator valve means and operable in response to the raising of the implement for reversing said valve means to alternately direct fluid under pressure from said lifting cylinder to said marker cylinders.

12. The invention set forth in claim 11, wherein said marker cylinders are single acting cylinders receiving fluid under pressure from the lifting cylinder to operate the marker cylinders in one direction to raise the markers, the fluid in the raised marker being returned by the lowering of the latter to the lifting cylinder when the implement is lowered.

13. The invention set forth in claim 12, wherein said lifting cylinder is a double acting cylinder having a raise side receiving fluid under pressure from said source to raise the implement and having a lower side receiving fluid under pressure from said source for lowering the implement, and wherein fluid is directed from said raise side to said marker cylinders to alternately raise the markers and is returned to said raise side when the markers are lowered.

14. The invention set forth in claim 13, wherein said alternator valve means has left and right hand ports communicating with the respective of said marker cylinders and a valve plunger shiftable to alternately open one and close the other of said ports, and the means connecting the lifting cylinder to said valve means for reversing the latter includes a part on the frame movable relative thereto with the raising and lowering of the implement and actuating means operatively connecting said part to said plunger to shift the latter.

15. The invention set forth in claim 14, wherein the implement is wheel supported and said part is an arm on the frame connected to the wheels and to the lifting cylinder for moving the arm and the wheels to raise and lower the frame, and wherein said actuating means includes a rockable member operatively connected to said valve plunger for shifting the latter in response to the movement of said arm.

16. The invention set forth in claim 15, wherein said actuating means also includes a slide member on the frame operatively connected to said arm and to said rockable member, the connection of said slide member to said rockable member being effective to rock the latter in opposite directions to alternately reverse said plunger in response to the movement of said arm in a direction to raise the implement.

* * * * *